United States Patent
Watkins et al.

(10) Patent No.: US 10,422,873 B2
(45) Date of Patent: Sep. 24, 2019

(54) WEARABLE ALARM SYSTEM INCORPORATING PHASED-ARRAY RADAR WATER SENSING

(71) Applicants: Charlotte Ann Watkins, Henderson, NV (US); Paul Lockwood, La Mesa, CA (US)

(72) Inventors: Charlotte Ann Watkins, Henderson, NV (US); Paul Lockwood, La Mesa, CA (US)

(*) Notice: Subject to any disclaimer, the term of this patent is extended or adjusted under 35 U.S.C. 154(b) by 0 days.

(21) Appl. No.: 16/016,629

(22) Filed: Jun. 24, 2018

(65) Prior Publication Data

US 2019/0004169 A1    Jan. 3, 2019

Related U.S. Application Data

(63) Continuation of application No. 15/479,989, filed on Apr. 5, 2017, now Pat. No. 10,036,808.

(Continued)

(51) Int. Cl.
| | |
|---|---|
| *H04W 56/00* | (2009.01) |
| *H04L 5/16* | (2006.01) |
| *H04L 27/227* | (2006.01) |
| *G08B 21/08* | (2006.01) |
| *G08B 21/02* | (2006.01) |
| *G01S 7/00* | (2006.01) |

(Continued)

(52) U.S. Cl.
CPC ........... *G01S 13/886* (2013.01); *G01S 7/003* (2013.01); *G08B 21/0222* (2013.01); *G08B 21/0225* (2013.01); *G08B 21/0227* (2013.01); *G08B 21/0236* (2013.01); *G08B 21/0238* (2013.01); *G08B 21/0247* (2013.01); *G08B 21/0294* (2013.01); *G08B 21/088* (2013.01); *H04L 5/16* (2013.01); *H04L 27/2272* (2013.01); *H04W 56/0015* (2013.01); *G01S 2013/0245* (2013.01)

(58) Field of Classification Search
None
See application file for complete search history.

(56) References Cited

U.S. PATENT DOCUMENTS

| | | | | |
|---|---|---|---|---|
| 5,289,163 A | * | 2/1994 | Perez ............... | G08B 21/0263 340/525 |
| 5,486,814 A | * | 1/1996 | Quinones .......... | G08B 21/088 340/569 |

(Continued)

*Primary Examiner* — Carlos Garcia
(74) *Attorney, Agent, or Firm* — Victoria L. Vaughn

(57) ABSTRACT

A safety system comprised of safety devices each worn by a caretaker and up to three people requiring minding, that alerts using color coded LED lights and audible tones when a monitored person is in danger. The device alerts if the person is beyond a preset distance, is close to or is in a body of water, or signals they are in trouble, using phased-array radar coupled with image processing.

The phased-array radar allows the remote sensing of water in either daylight or night. The phased-array radar comprises multiple antenna elements including an independent antenna element phase shifter allowing beamsteering. The device scans an object using a preset beamsteering algorithm independent of movement. The multiple antenna elements and beamsteering improve image data accuracy which is then interpreted and correlated with a body of water characteristics. The phased-array radar is also used for caretaker-monitored person communications.

12 Claims, 8 Drawing Sheets

Related U.S. Application Data

(60) Provisional application No. 62/390,727, filed on Apr. 6, 2016.

(51) Int. Cl.
*G01S 13/88* (2006.01)
*G01S 13/02* (2006.01)

(56) References Cited

U.S. PATENT DOCUMENTS

| | | | |
|---|---|---|---|
| 6,720,881 B1* | 4/2004 | Halliday | A01K 15/023 |
| | | | 119/721 |
| 7,236,880 B2* | 6/2007 | Fager | G01S 5/163 |
| | | | 701/521 |
| 7,259,682 B2* | 8/2007 | Vannerus | G08B 21/0247 |
| | | | 340/539.11 |
| 7,733,224 B2* | 6/2010 | Tran | G06F 19/3418 |
| | | | 340/540 |
| 9,235,972 B2* | 1/2016 | Hoffman | G08B 25/08 |
| 2001/0048364 A1* | 12/2001 | Kalthoff | G01S 5/0009 |
| | | | 340/573.1 |
| 2012/0032796 A1* | 2/2012 | Jarrett | G08B 21/0244 |
| | | | 340/539.11 |
| 2017/0294094 A1* | 10/2017 | Watkins | G01S 7/003 |

* cited by examiner

| 4 bits | 2 bits | 1 bit | 3 bits | 1 bit |
|---|---|---|---|---|
| Network ID | Device ID | Frequency Band | Condition | Stop bit |

FIG. 4

| Logic Level | 5 GHz Band | 2.4 GHz Band |
|---|---|---|
| 0 | 5.7 GHz | 2.4 GHz |
| 1 | 5.75 GHz | 2.45 GHz |

FIG. 7

WEARABLE ALARM SYSTEM INCORPORATING PHASED-ARRAY RADAR WATER SENSING

This application is a continuation of U.S. Utility application Ser. No. 15/479,989 filed Apr. 5, 2017, which claims priority from U.S. Provisional Application 62/390,727, filed Apr. 6, 2016. The entire contents of the aforementioned patent applications are incorporated herein by this reference.

FIELD

This invention relates generally to a personal alarm system that is used to alert a user when an individual being monitored is in danger. In particular, a system and wearable monitoring devices aimed at preventing drowning.

BACKGROUND

It is well established that children can easily fall into a body of water such as a swimming pool or wander into the ocean and end up drowning. In the past, a parent kept track of a child by holding their hand or by tethering the child to themselves using some sort of leash, but many would view tethering as child abuse and it could be dangerous if the tether is too long allowing it to be caught, trapping the child and the parent as well in a dangerous situation.

There are different types of devices and systems that have been suggested to avoid these tragedies but they fail to alert the child's guardians early enough to make them effective. They also tend to be complicated to use or too basic to provide any value. Some systems fail to accurately alert to a water danger or water emergency, or fail to provide any advanced warning of the child's proximity to the water danger, and tend to be limited to one body of water and are not portable.

For the foregoing reasons, there remains a need for a system to alert a parent before a child enters any large body of water providing a parent an opportunity to intervene from enough notice.

SUMMARY

It is an object of present technology to provide improvements, in particular improvements aiming at preventing a child from dangerous situations.

The present technology arises, in one aspect, from an observation made by the inventor that no apparatus or device exist using technology that gives adequate and accurate notice to a parent when that child is within meters of a body of water large enough to drown in or the ability to relay other information related to dangerous situations children may find themselves in.

The objective of the invention is to accomplish at least one of the following:
- to notify the parent when a child wearing the safety device is beyond a preset distance;
- to notify the parent when the child wearing the safety device is close to water;
- to notify the parent when the child wearing the safety device is in water;
- to notify the parent when the child wearing the safety device has requested their help; and
- to notify the child or children wearing the safety devices that they are to proceed home or to a pre-agreed upon destination.

This invention is of a wearable monitoring alarm system for alerting a parent that a child may be in a dangerous situation or may be at risk of drowning. Although this invention refers to a parent and a child, it is also applicable to those requiring supervision in public spaces such as the elderly or those with special needs. For simplicity and clarity, those responsible for supervision such as a parent, a caretaker, or a custodian will be referred to as a "parent". Those who need supervision such as a child, an elderly person or a special needs person will be referred to as a "child".

This system notifies a parent when a triggering event occurs. This triggering event happens when the parent safety device becomes separated for greater than a pre-determined distance from the monitored child's safety device, or if the child is near a large body of water, or if the child becomes immersed in water or if the child signals they are in need of help. The system also enables the parent to quickly trigger an alert on the child safety device.

The system comprises two to four identical safety devices which are each encased in waterproof materials. One safety device is worn by the parent and a safety device is worn by each of up to three children who require supervision. The devices are configured during wireless setup to identify the parent safety device and the child safety device. The status of each safety device is sent and received wirelessly to alert the parent when one or more of the children are in a dangerous situation and is communicated via a visual display of LEDs as well as audio speakers.

The visual display of the safety devices comprises three data arrays wherein each represents one child's current safety status. The monitored children's safety devices send an alert that lights up the LEDs in their related data array and makes an audible tone whenever a child is beyond a selected distance, near a body of water, or in water, or if the child signals they are in trouble.

Thus, in one aspect, a method to notify the parent when a child is beyond the selected distance limit by employing a power detector that determines when the child wearing the safety device is beyond the selected distance and then alerting the parent safety device with an audible tone and red LED light.

Thus, in another aspect, a method to notify the parent when a child is close to water by employing phased-array radar which uses image processing to determine if the monitored child is within 1 to 2 meters (about 5 feet) of the body of water that is at least 3 meters square (about 9 square feet) in size, and then alerting the parent safety device with an audible tone and a red LED flashes; if the child is also beyond the preset distance, an addition red LED light is turned on.

Thus, in another aspect, a method to notify the parent when a child is in water by employing water sensors that when contact is made with water, the short between the sensors results in alerting the parent safety device with an audible tone and a red LED is turned on; if the child is also beyond the preset distance, an addition red LED light is turned on.

Thus, in another aspect, a method to notify the parent when a child requests help by pressing a notify button on the child safety device which results in alerting the parent safety device with an audible tone and a yellow LED is turned on; if the child is also beyond the preset distance, an addition red LED light is turned on.

Thus, in another aspect, a method to provide the parent a way to contact the monitored child or children by pressing the notify button on their safety device which results in alerting all monitored children with an audible tone from the child safety device and lighting up two red LEDs. The meaning of the notification is agreed to between the parent and monitored children beforehand such as meeting at a designated place or to return to a home.

Communication between devices uses a wireless method wherein each child safety device continuously transmits and receives a condition sequence code with the parent safety device in half-duplex, preventing transmit circuits from interfering with the receive circuits.

The present invention employs a multiple antenna element phased-array radar in the child safety device which uses a method to continually steering the beam according to a pre-defined digital image processing algorithm independent of the monitored child's movement; interpreting the radar reflections to identify a body of water; and sending a condition sequence code to the parent safety device.

In some implementations, the multi-element phased array radar is configured such that the safety devices use and can switch between a 2.4 GHz band and a 5 GHz ISM band to communicate depending upon the interference level detected by a power detector. Demodulation occurs using a digital phase-locked loop and a correlator implemented in the microcontroller.

In some implementations, the multi-element phased array radar is configured to operate in the unlicensed V-Band or at a lower frequency band.

Each safety device requires 3 W of power which is delivered by an internal power supply within the safety device.

Additional and/or alternative features, aspects and advantages of implementations of the present technology will become apparent to one skilled in the art from the following description, the accompany drawings and the appended claims.

BRIEF DESCRIPTION OF THE DRAWINGS

The accompanying drawings, which are incorporated in and constitute a part of the specification, illustrate embodiments of the invention and together with the description serve to explain the principles of the invention, where:

FIG. 4 presents a table illustrating the bit sequence representation of the present invention;

FIG. 7 presents a table illustrating the frequencies used in some embodiments of the present invention.

DETAILED DESCRIPTION

Figure 1:
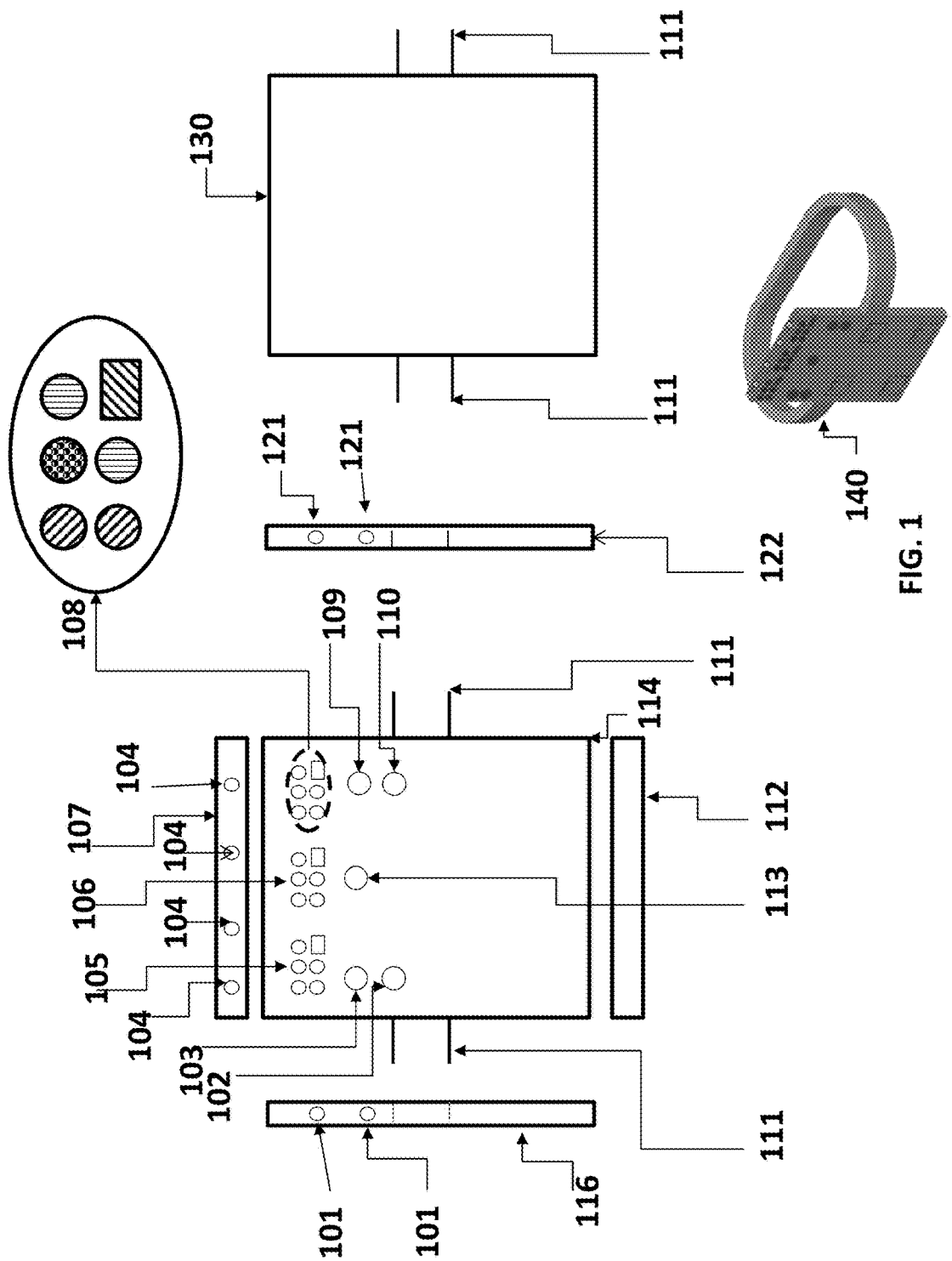
FIG. 1 presents a front perspective drawing of the wearable monitoring alarm system housing of the present invention.

The examples provided and conditional language recited here are primarily intended to assist the reader in understanding the principles of the present technology and not limit the scope to such specifically recited examples and conditions. It will be appreciated that those skilled in the art may devise various versions that although not explicitly described or shown herein nonetheless embody the principles of the present technology and are included within its spirit and scope.

Furthermore, the following description may describe relatively simplified implementations of the present technology as an aid to understanding. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples, thereof, are intended to encompass both structural and functional equivalents thereof, whether they are currently known or developed in the future. For example, it will be appreciated by those skilled in the art that any block diagrams herein represent conceptual views of illustrative circuitry embodying the principles of the present technology. Similarly, it will be appreciated that any flowcharts, flow diagrams, state transition diagrams, and the like represent various processes which may be substantially represented in computer-readable media and so executed by a computer or processor, whether or not such computer or processor is explicitly shown.

The functions of the various elements shown in the figures, including any functional block labeled as a "processor," may be provided through the use of dedicated hardware as well as hardware capable of executing software in association with appropriate software. When provided by a processor, the functions may be provided by a single dedicated processor or by a plurality of individual processors. In some embodiments of the present technology, the processor may be a general purpose processor, such as a central processing unit (CPU) or a group of cooperating CPUs, or may alternatively be a processor or a group of co-processors dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, read-only memory (ROM) for storing software, random access memory (RAM), and non-volatile storage. Other hardware, conventional and/or custom, may also be included.

Software modules, or simply modules which has been implied to be software, may be represented herein as any combination of flowchart elements or other elements indicating performance of process operations and/or textual description. Such modules may be executed by hardware that is expressly or implicitly shown.

FIG. 1 is a drawing that illustrates the housing of a safety device 140 in accordance with an embodiment of the invention, a wearable monitoring alarm system. The safety device, which is worn by a supervising adult (such as a parent), and another identical safety device is worn by a person who needs minding (such as a child), is shown with a front side 114. The system alerts the parent when said child is beyond a selected distance, or is close to water, or is in a body of water, or said child signals they are in trouble, or said parent wishes to contact said child. The system can monitor up to two additional children who would also each wear the safety device on an arm.

The safety device 140 has a waterproof housing comprising a front piece 114 and a back piece 130 of identical size and of a rectangular shape, wherein the front 114 and the back pieces 130 are separated and connected by a set of four sides comprising a left side piece 116, a top side piece 107, a right side piece 122, and a bottom side piece 112, each of which have an equal height to separate an exterior space outside of the housing from an interior space inside of the housing.

The front piece 114 is comprised of a visual display assembly comprising a set of three embedded LED data array matrixes (105, 106, 108), an embedded set of buttons (102, 103, 109, 110, 113), and is connected on the left side 116 and on the right side 122 with a waterproof wrist band 111 assembly designed to be worn on the top side of the user's arm.

The wristband assembly 111 is comprised of a waterproof strap having a first end and a second end attached to the exterior of the housing assembly at a midpoint on the left side 116 of said safety device housing. There is a second waterproof strap having a first end and a second end attached at a midpoint on the exterior of the safety device housing on the right side 112 opposite of the first waterproof strap. The two unconnected ends of the straps are connected such that the strap is adjustable to fit different wrist sizes.

A first data array matrix 105 is located in the top left corner of the visual display assembly on the front side 114 of the housing which corresponds to a first monitored child. A second data array matrix 106 is located in the top center of the visual display assembly on the front side of the housing and corresponds to a second monitored child. A third data array matrix 108 is located in the top right corner of the visual display assembly on the front side 114 of the housing and corresponds to a third monitored child.

Each LED data array matrix (105, 106, 108) is identical and is comprised of an electronic module that comprises two rows and three columns. The three columns in the first row and the first two columns in the second row each contain a button comprised of a water proof material such as silicone elastomer that is backlit by an LED light. Wherein the LED in the first row and first column is green, the LED in the first row and second column is yellow, and the LED in the first row and the third column is red, which can be flashed on and off. In the second row, the LED light in the first column is green, the second row and second column is red. The second row third column contains an audio speaker for audible alerts.

The LEDs in a data array matrix (105, 106, 108) on the receiving designated parent safety device light up corresponding to a specific condition sequence code and only for the data array corresponding to the sending child device. The condition sequence codes indicate what the dangerous situation may be. An audible tone is heard from speaker on the receiving safety device to announce a change in status whenever a condition sequence code is received.

Visible on the front side 114 as well are a set of control buttons (102, 103, 109, 110, 113), each comprised of a water proof material such as silicone elastomer which are backlit, which are arranged in a matrix comprised of two rows and three columns. The control button matrix is located directly below the data array matrixes (105, 106, 108). The button in the first column and first row 103 designates the safety device as a parent device during the setup process. The button in the second column of the first row 113 is for the parent to either notify the children of a preset message or for a monitored child to send a panic notice to the parent. The button in the third column of the first row sets the distance for a child to be considered out of range 109. The button in the first column of the second row is used in the setup process to synch 102 the parent device with a child device. The button in the third column of the second row provides a way to power on and off the safety device on or off 110.

The left side piece 116 has two water sensors 101 embedded above an attached wristband 111, the top side piece 107 has four water sensors 104 embedded in a row equally spaced across, and the right side piece 122 has two water sensors 121 embedded in a column above the other attached end of the wristband 111.

Contained between the front piece 114 and the back piece 130 and contained within the set of four sides (116, 107, 122, 112) of the housing, are a set of internal systems that are comprised of an electronic system that enables the transmit and receive functions comprising a classical superheterodyne transceiver, an array of antenna elements with a phase shifter in each of said antenna elements, a local oscillator, an analog to digital converter (ADC), a receiver, a DSP/microcontroller, a digital to analog converter (DAC), a mixer, a phase shifter, and a clock.

Figure 5:
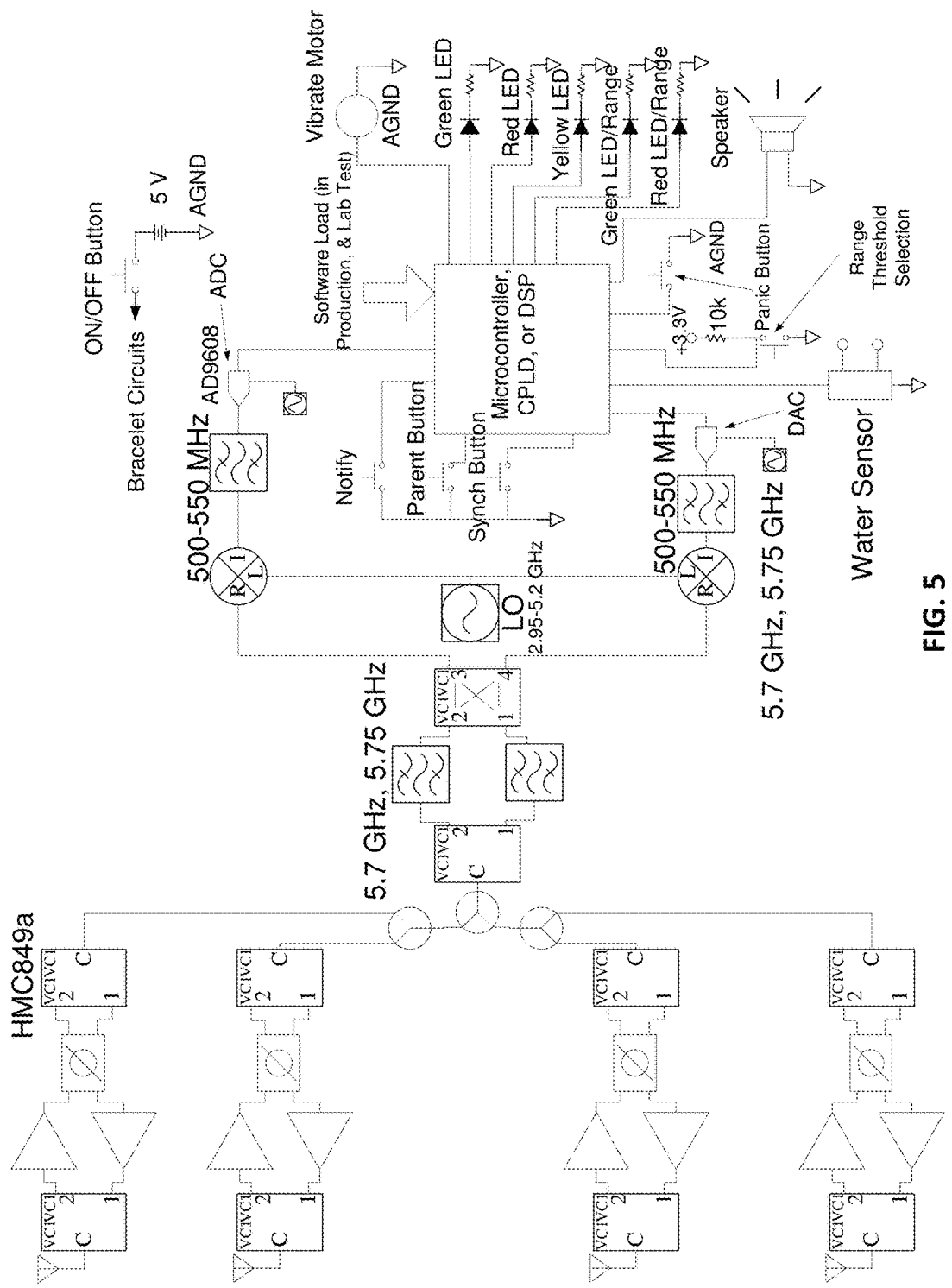
FIG. 5 presents a block diagram illustrating the phased-array radar according to some embodiments of the present invention.

In an example implementation, FIG. 5, provides a block diagram for an internal electronic system using a 2.4/5 GHz communications comprised of a set of RF switches, a set of amplifiers, a set of phase shifters used with a radar system, a set of Wilkinson power dividers that are optimized for 2.4-5.7 GHz performance, an RF mixer (from 2.4/5 GHz to 500 MHz); the intermediate frequency circuits are comprised of a set of filters, a set of amplifiers, a set of transformers, and a set of data converters that are optimized for the 500 MHz range, a 2.95/5.2 GHz frequency synthesizer for a LO signal to an RF mixer for frequency conversion in the RX and TX paths, and a separate synthesizer is used for a clock for the data converters.

Figure 2:
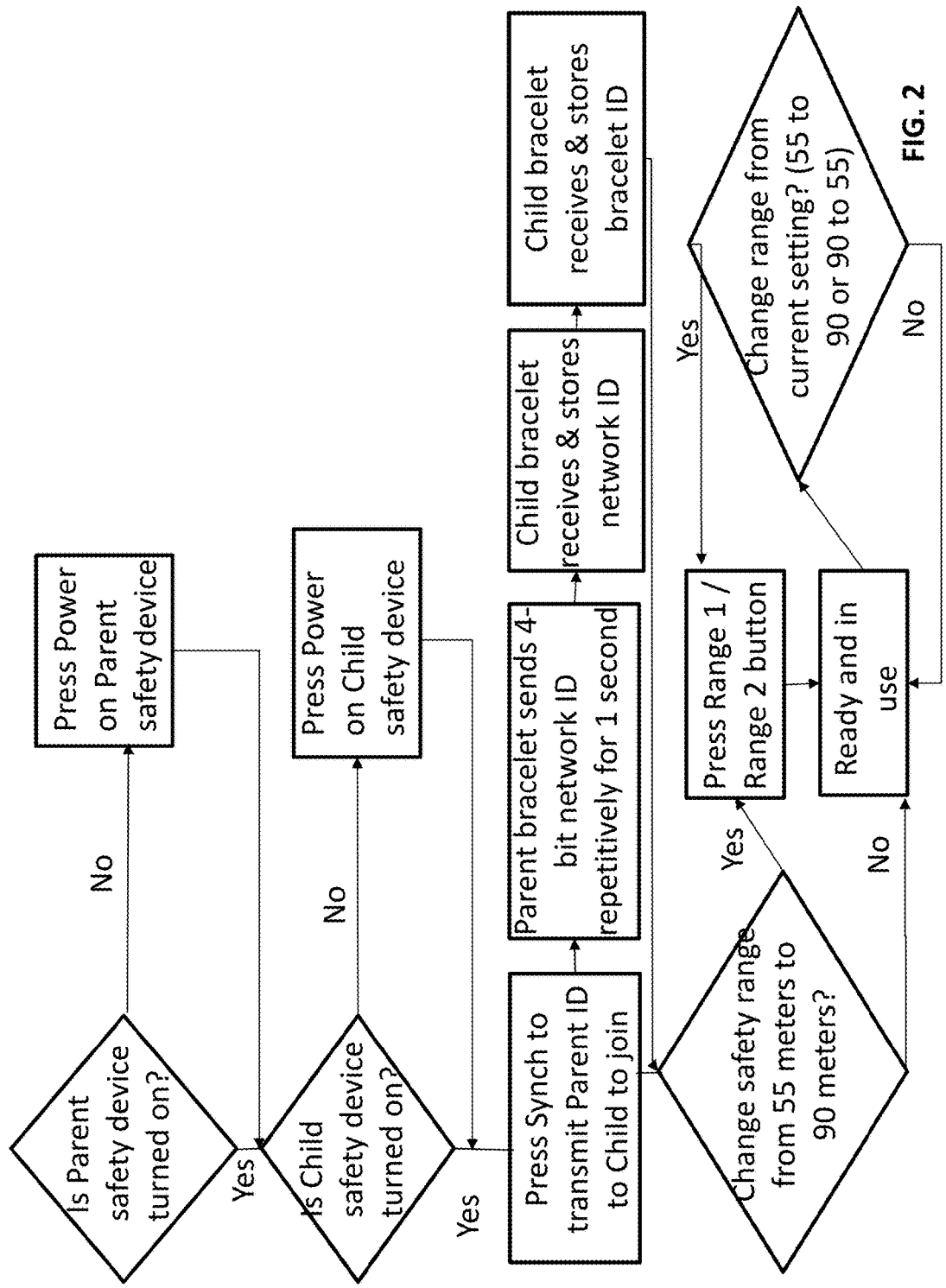
FIG. 2 presents a flow diagram illustrating how to set up a wearable monitoring alarm system of the present invention.

FIG. 2 is a flow diagram that illustrates the method of setting up the wearable monitoring alarm system of the present invention. The setup method is comprised of:

determining whether the parent safety device is currently powered on; if it is not already on, the power button 110 on the designated parent safety device is pressed;

determining whether the child safety device is currently powered on; if it is not already on, the power button 110 on the child safety device being put into service is pressed;

pressing the SYNCH button 102 on the parent safety device and the child safety device at the same time allowing the child safety device to join the network; this will transmit the stored Network identification ("ID") and the Device ID to the child safety device which stores the IDs, allowing the child safety device to receive and process data from the parent safety device as well as the parent device to receive and process data from the child safety device; and selecting an out-of-range distance; a default distance is about 55 meters (60 yards) and can be changed to a longer distance of about 90 meters (100 yards) by pressing the range button 109 on the parent safety device; this action generates a transmission to the child safety device which then receives and sets the new distance, or does nothing and uses the default out-of-range distance; the distance can be toggled between the default distance and the long distance by pressing the range button 109 again.

The present invention uses a method to determine the distance of the child safety device from the parent safety device comprised of measuring the drop in power using a power detector in the safety device, calculating the distance, and then issuing the condition sequence code to alert the parent safety device.

The present invention uses the same method of setting up and synching the parent and child safety device for when a second child safety device or a third child safety device is added to the safety alarm system.

The present invention uses a set of antenna elements in the parent safety device and a set of antenna elements in the child safety device to facilitate radio frequency transmit and receive data. A method used for transmitting and receiving data similar to time-division multiple access (TDMA) comprising transmitting in a timeslot by each child safety device that is determined by the order in which it was added to the network on a periodic basis of every 500 µs to 50 ms. The method minimizes collisions and interference at the parent safety device receiver and the child safety devices.

FIG. 4 shows the bit sequence sent from the child safety device of the present invention. The first four bits are for the Network ID and the next two bits for the Device ID, which are determined during setup with the parent safety device. The next one bit is the frequency band that is being used. It is determined by the child safety device based upon the amount of traffic in use over the bands. The next three bits are the Condition bits which are determined by the status of the child safety device at that time. The condition represents a triggering event such as the child safety device being beyond a set distance, is close to water, is in water or the child has requested help. A last digit, a stop bit is used to signify the end of the sequence.

Figure 3:
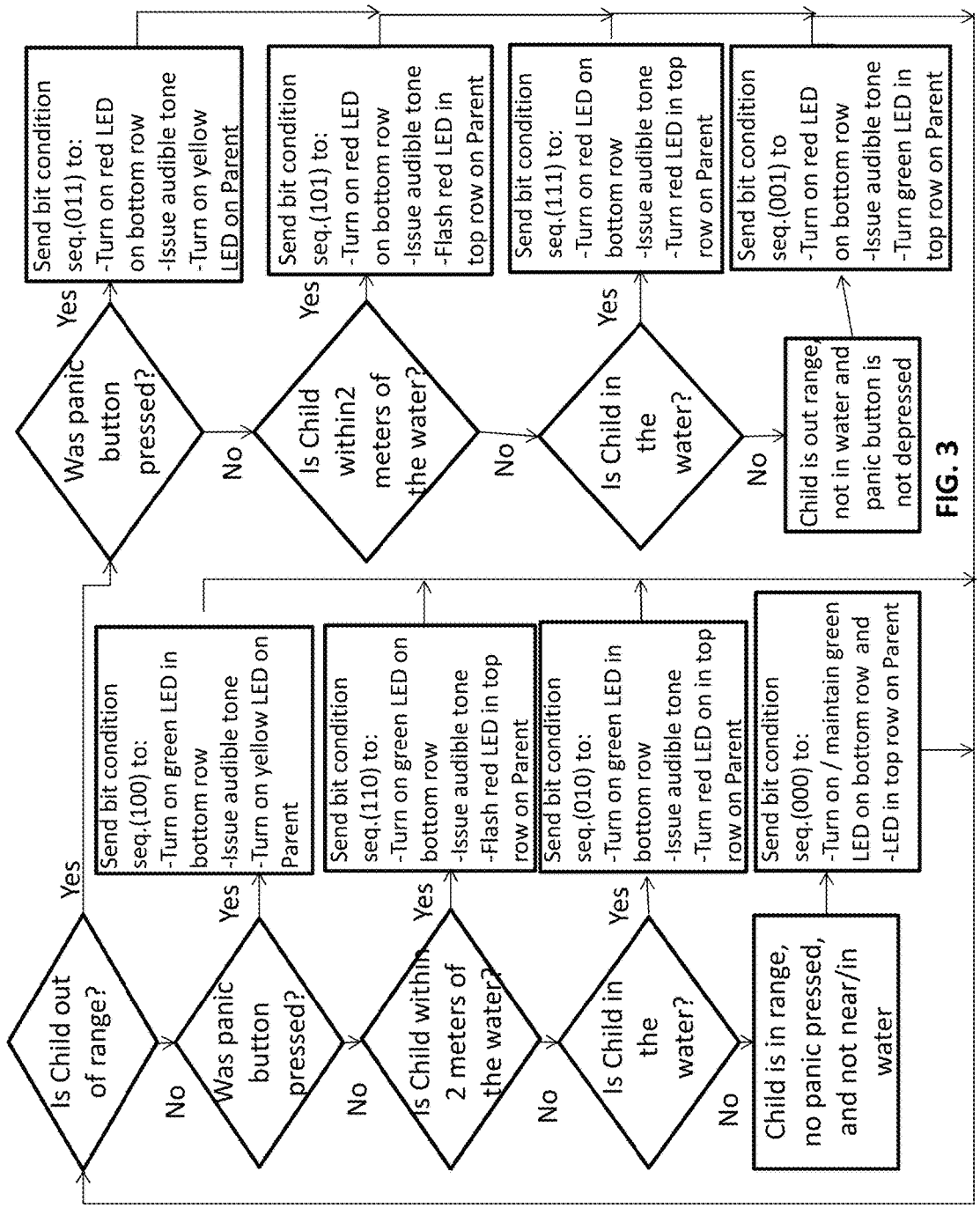
FIG. 3 presents a flow diagram illustrating LED color interpretation and sequence codes of the present invention.

The flow diagram in FIG. 3 illustrates LED color interpretation and condition sequence codes transmitted to the parent safety device of the present invention. The condition sequence codes sent from the child safety device to the parent safety device is determined by the environment the child safety device is experiencing and whether or not the child safety device is within range of the parent safety device. The first row of each data array matrix (105, 106, 108) represents the condition of the child safety device and the LEDs in the second row of each data array matrix (105, 106, 108) represent the range of the child safety device.

For example, if the child safety device is within range and none of the triggering events have occurred, the default bit condition sequence used is "000". This sequence notifies the parent safety device to turn on and or maintain the two green LEDs in the LED data array matrix (105, 106, 108) for the specific child safety device that sent it using the Device ID to determine which matrix to light up. No audible tone will be issued as this is the representation of a default safe state for the child safety device.

For all triggering events, the speaker in the data array matrix (105, 106, 108) will issue an audible tone to alert on the parent safety device along with the appropriate LED lights being turned on.

For example, if a child safety device is determined to be out range by the power detector in the child safety device and no other triggering event is occurring, the bit condition sequence code sent is "001" which turns on the red LED in the first column of the second row for that child device's data array matrix (105, 106, 108) on the parent safety device and issues an audible tone alert on the parent safety device.

Another example of the present invention, when a child presses the notify/panic button 113 on the child safety device and the device is within range, the bit condition sequence code sent is "100", which turns on the green LED in the first column in the second row and turns on the yellow LED for that child device's data array matrix (105, 106, 108) on the parent safety device and issues an audible tone alert on the parent safety device.

Another example of the present invention, when a child presses the notify/panic button 113 on the child safety device and the device is out of range, the bit condition sequence code sent is "011", which turns on the red LED in the second column second row and turns on the yellow LED for that child device's data array matrix (105, 106, 108) on the parent safety device and issues an audible tone alert on the parent safety device.

Another example of the present invention, when the child safety device phased-array radar system remotely senses the near proximity of water that covers more than about three square meters (about 9 square feet) and the device is within range, the bit condition sequence code sent is "110", which turns on the green LED in the first column in the second row and causes the red LED in the first row of the parent to flash off and on for that child device's data array matrix (105, 106, 108) on the parent safety device and issues an audible tone alert on the parent safety device.

Another example of the present invention, when the child safety device phased-array radar system remotely senses the near proximity of water that covers more than about 3 square meters (about 9 square feet) and the device is out of range, the bit condition sequence code sent is "101", which turns on the red LED in the second row and causes the red LED in the first row of the parent to flash off and on for that child device's data array matrix (105, 106, 108) on the parent safety device and issues an audible tone alert on the parent safety device.

Another example of the present invention, when any two of the child safety device water sensors (101, 104, 121) are electrically shorted together by being connected with water, the child safety device determines it is submersed in a body of water. When the device is within range, the bit condition sequence code sent is "010", which turns on the green LED in the first column in the second row and causes the red LED in the first row of the parent safety device to turn on for that child device's data array matrix (105, 106, 108) on the parent safety device and issues an audible tone alert on the parent safety device.

Another example of the present invention, when any two of the child safety device water sensors (101, 104, 121) are electrically shorted together by being connected with water, the child safety device determines it is submersed in a body of water. When the device is out of range, the bit condition sequence code sent is "111", which turns on the red LED in the second row and causes the red LED in the first row of the parent safety device to turn on for that child device's data array matrix (105, 106, 108) on the parent safety device and issues an audible tone alert on the parent safety device.

Figure 6:
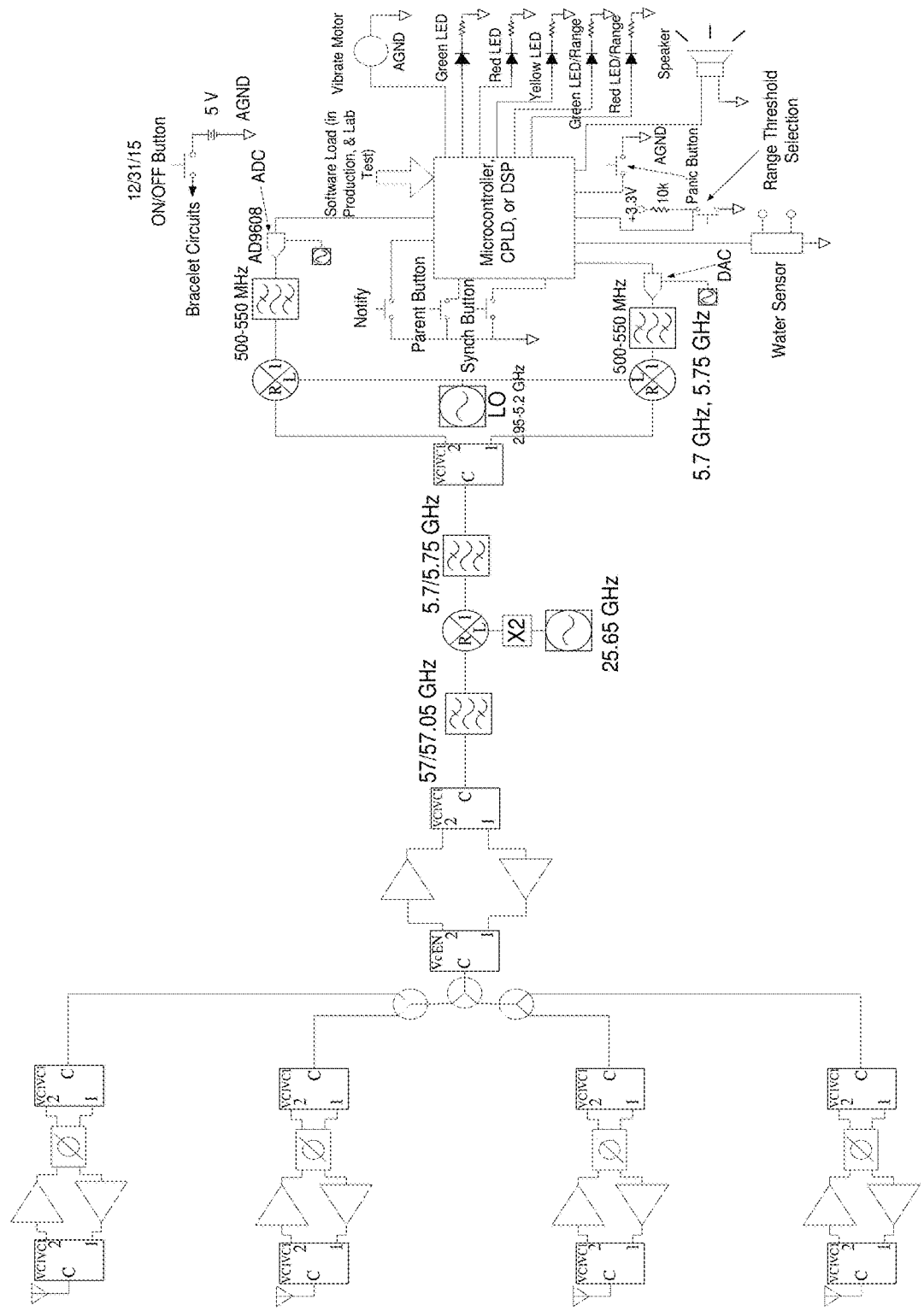
FIG. 6 presents a block diagram illustrating the phased-array radar using the V-Band according to some embodiments of the present invention.
Figure 8:
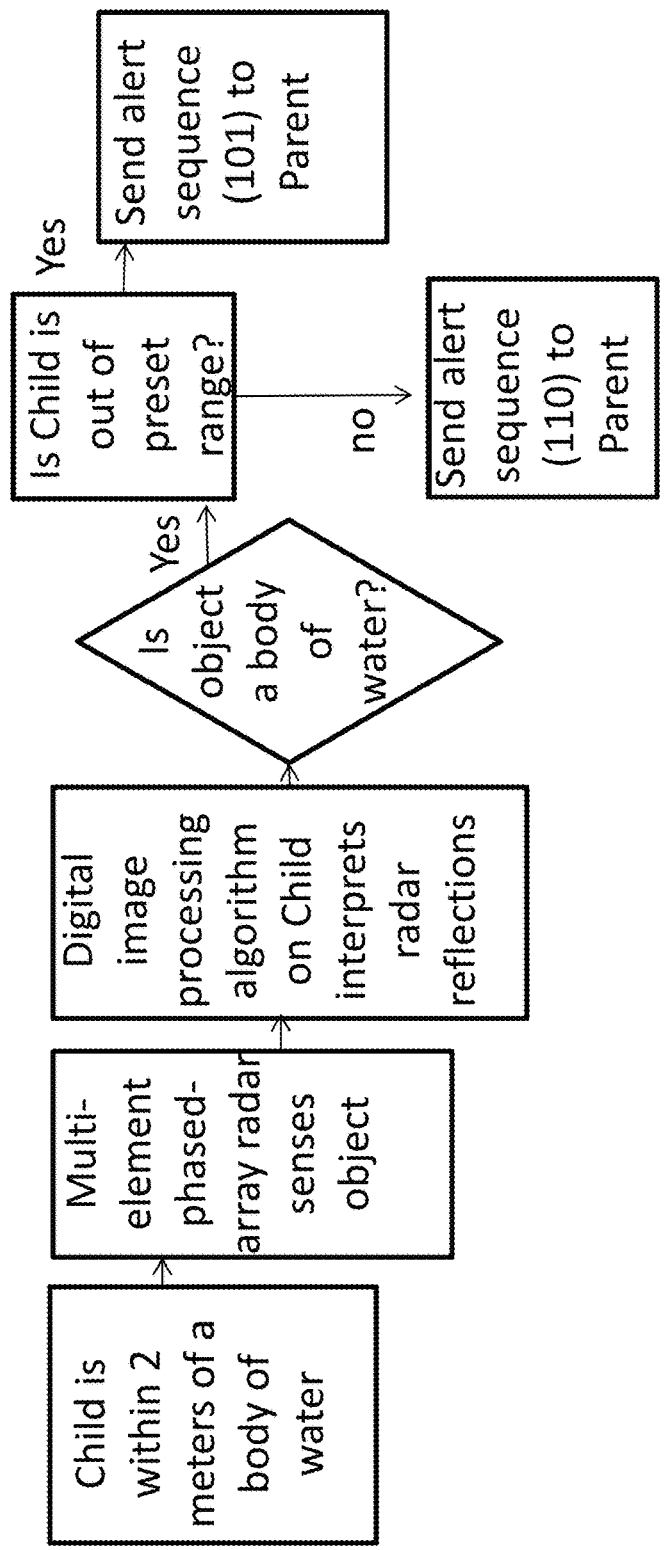
FIG. 8 presents a flow diagram illustrating operations according to some embodiments of the present invention.

The general circuits in FIG. 5 and FIG. 6 of the present invention represent a classical superheterodyne transceiver for almost error-free transmission and reception between the safety devices. The circuits are optimized to receive and transmit 5.7-5.75 GHz or 2.4-2.45 GHz. The safety system comprises a transmit (TX) and a receive (RX) circuit. The RX and TX operation is controlled by a microcontroller/DSP.

The circuit design comprises an array of antennas to narrow an antenna beam to achieve finer resolution in the radar returns and a phase shifter in each antenna element are independently set to effect beam steering.

The local oscillator (LO) downconverts the RX signal to the intermediate frequency (IF) of either 500 MHz or 550 MHz. The LO is a frequency synthesizer which outputs 5.2 GHz when the TX/RX signal 5.7 GHz or 5.75 GHz. When the system is configured for the 2.4 GHz ISM band, the LO outputs 2.95 GHz when the TX/RX signal is 2.4 GHz or 2.45 GHz. In the RX path, the LO at the mixer LO port downconverts the 2.4/2.45/5.5/5.75 GHz signal to 500 MHz or 550 MHz. The filters in the design attenuate unwanted signals from nearby strong interferers and mixer spurious products.

The gain in the RX chain is designed for a high dynamic range. The receiver has a low noise floor to receive low-power signals transmitted from about 91 meters (100 yards) away for a low probability of error. The receiver has a high compression point to receive signals that are close to the receiver without creating intermodulation distortion.

The analog-to-digital converter (ADC) is clocked with 1.2 GHz frequency synthesizer.

The receiver is designed to receive signals in a range of −117 dBm to −30 dBm.

In FIG. 5 of the present invention, a data transmission method for the safety devices is comprised of the following:
  sending a digital bit sequence from a DSP/microcontroller to a digital-to-analog converter (DAC); the DAC outputs a frequency-shift-keyed (FSK) modulated waveform that is either at 500 MHz for a logic 0 or 550 MHz for a logic 1 (in the 5 GHz ISM band and the opposite in the 2.4 GHz band);
  upconverting the DAC output by a mixer to either 2.4/2.45 GHz or 5.7/5.75 GHz; and
  sending the upconverted signal to each of the antenna elements which comprises a phase shifter and amplification; each phase shifter is independently set to steer a beam in a predefined manner to transmit to the child safety device or to scan for a body of water.

The circuits of the present invention employ a digital-to-analog converter (DAC) that is clocked with the same clock used for the ADC (1.2 GHz).

The present invention safety device detects water submersion using a set of sensors residing on the three of sides (116, 107, 122) of the housing 114 comprised of copper and a thin chem film coating on the outward side of the sensor to prevent corrosion. A preferred embodiment of the chem film coating would be aluminum chromate, or Alodine, or Iridite. When any two sensors are connected by water, they are electrically shorted and an approximately 50 mV is sent to an input pin on the DSP/microcontroller. The DSP/microcontroller will interpret the low voltage as an instance of contact with water.

The present invention parent safety device operates in an omni-directional mode continually. The omni-directional mode is enabled by setting the phase shifters in each element to 0 degrees. The child safety device operates in an omni-direction mode when it sends status to the parent safety device or when it senses a bit sequence from the parent safety device.

In FIG. 6 of the present invention, another embodiment of the phased-array radar operates in the V-B and (57 GHz) wherein the higher operating frequency enables smaller patch antennas to be used creating lower achievable beam widths and higher antenna gain. This embodiment consists of two frequency conversions. The receiver and transmit front end circuits are comprised of a set of RF switches, a set of amplifiers, a set of phase shifters, and a set of Wilkinson power dividers that are optimized for 57/57.05 GHz performance. The second frequency conversion uses a V-Band mixer to convert 57/57.05 GHz to 5.7/5.75 GHz. An LO port of the mixer is driven by a 51.3 GHz frequency synthesizer output. A second IF created by this conversion comprising RF switches, filters and amplifiers optimized for 5.7/5.75 GHz performance.

In the present invention, the first frequency conversion creates the first intermediate frequency (IF). Frequency conversion occurs with an RF mixer from 2.4/5 GHz to 500 MHz. The IF circuits are comprised of filters, amplifiers, transformers, and data converters that are optimized for the 500 MHz range.

In the present invention, the safety device transmits and receives data communications in half-duplex such that each safety device can transmit and receive at the same set of frequencies without the transmit circuits interfering with the receive circuits and without the receive circuits interfering with the transmit circuits. The safety device uses a power detector to sample the power levels to determine whether the 2.4 GHz ISM band or the 5 GHz ISM band has the lowest interference level.

In another embodiment of the present invention, the child safety device transmits alternatively between the 2.4 GHz ISM band and the 5 GHz ISM band on a regular basis where the demodulation will occur using a digital phase-locked loop and a correlator implemented in the microcontroller.

In the present invention, the multi-element phased-array radar in the child safety device continually steers the beam according to a pre-defined digital image processing algorithm, which is independent of the monitored child's movement, to interpret the radar reflections to identify a body of water within about 2 meters (about 5 feet) of the child safety device and sends a condition sequence code to the parent safety device. The phased-array radar allows the remote sensing of water to occur either in daylight or at night since the electromagnetic transmission from a child safety device to the surroundings and the reflection from the surrounding independent of daylight. The phased-array radar is integrated with a transceiver and operates in the same frequency band. The multiple antenna elements and beamsteering improves the accuracy of the image data generated which is then interpreted and correlated with a body of water characteristics while a firmware application controls the settings of a phase shifter in a transmit/receive module of the phased-array antenna element. The phased-array radar is active until it detects water and sends an alert, or receives a bit sequence from the parent safety device to transmit its status, or the Notify button on the child safety device is pressed, or a Notify signal is received from the parent safety device.

In the present invention, the phased-array radar shares a transceiver and operates in the 5 GHz and 2.4 GHz ISM bands wherein the phased array radar comprises a multiple of radar elements arranged in a square or circular pattern wherein each radar element comprises a transmit/receive module connected to a patch antenna.

Another embodiment in the present invention of the phased-array radar operates in the unlicensed V-Band or a lower frequency band and is comprised of: a set of phased-array radar and antenna elements that have lower achievable beamwidth and higher antenna gain located in the interior space of the housing assembly; a set of two frequency converters, a set of transmission circuits comprised of RF switches, amplifiers, phase shifters and optimized power dividers optimized for 57/57.05 GHz performance in the interior space of the housing assembly; and a set of intermediate frequency circuits comprised of filters, amplifiers, transformers, and data converters in the interior space of the housing assembly.

It should be expressly understood that implementations of the system and of the method for using phased-array radar are provided for illustrative purposes. As such, those skilled in the art will easily appreciate other specific implementation details for the system and for the method for processing data shared between safety devices. As such, by no means, examples provided herein above are meant to limit the scope of the present technology.

While the above-described implementations have been described and shown with reference to particular operations performed in a particular order, it will be understood that these operations may be combined or re-ordered without departing from the teaching of the present technology. Accordingly, the order and grouping of the operations is not a limitation of the present technology.

Some of these operations and signal sending-receiving are well known in the art and, as such, have been omitted in certain portions of this description for the sake of simplicity.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A wearable safety device comprising:
   a) a housing assembly,
   b) a set of antenna elements,
   c) a multi-element phased-array radar system,
   d) one or more water sensors,
   e) a power detector,
   f) a notify button,
   g) a range button,
   h) a synch button,
   i) a power on and off button,
   j) a frequency converter,
   k) a set of transmission circuits comprising:
      i. one or more RF switches,
      ii. one or more amplifiers,
      iii. one or more phase shifters, and
      iv. one or more optimized power dividers; and
   l) a set of intermediate frequency circuits comprising:
      i. one or more filters,
      ii. one or more amplifiers,
      iii. one or more transformers, and
      iv. one or more data converters.

2. The wearable safety device of claim 1, wherein:
   a) the safety device is configurable as a parent or as a child device;
   b) the parent device communicates with a plurality of child devices; and
   c) each child device communicates with the parent device.

3. The wearable safety device of claim 1, wherein the housing assembly is waterproof and further comprises:
   i. a visual display assembly; and
   ii. one or more water sensors embedded in the sides of the housing assembly.

4. The wearable safety device of claim 1, wherein the set of antenna elements transmit and receive condition sequence codes:
   a. from the child safety device to the parent safety device; and
   b. from the parent safety device to the child safety device.

5. The wearable safety device of claim 1, wherein the multi-element phased-array radar system:
   a. is integrated with a transceiver operating in the same frequency band; and
   b. comprises more than one radar element wherein each radar element comprises a transmit/receive module connected to a patch antenna.

6. The wearable safety device of claim 5, wherein the multi-element phased-array radar system:
   a. interprets radar reflections to identify a nearby body of waters sending an audible and a visual alert communication to the parent safety device when water is identified;
   b. senses water in either daylight or at night; and
   c. operates in either the 5 GHz or 2.4 GHz ISM bands.

7. The wearable safety device of claim 1, wherein submersion in water:
   a) causes a submersion condition sequence code to be sent from the child safety device to the parent safety device; and
   b) produces an audible and a visual alert on the parent safety device.

8. The wearable safety device of claim 1 wherein the power detector determines when the child safety device is beyond a pre-selected distance from the parent device creating:
   a distance condition sequence code that is sent from the child safety device to the parent safety device; and
   the parent safety device produces an audible and a visual alert when the condition sequence code is received.

9. The wearable safety device according to claim 1, wherein the frequency converter transmits and receives data:
   a. in half-duplex between each safety device at the same set of frequencies without the transmitting circuits interfering with the receiving circuits;
   b. in a 2.4 GHz band or a 5 GHz ISM band.

10. The wearable safety device of claim 4, wherein the condition sequence code comprises:
    a. a 4-bit network ID data which is provided by the parent safety device when setting up and synching with the child safety device;
    b. a 2-bit device ID data provided by the parent safety device when setting up and synching with the child safety device to identify a data source when the child safety device sends data;
    c. a 1-bit frequency band data set by the child safety device;
    d. a 3-bit condition code which is generated by the sending child safety device and contains status information on whether the safety device is beyond a set distance, is near water, is in water or said monitored child has requested help; and
    e. a 1-bit stop bit.

11. The wearable safety device of claim 1, wherein pressing the notify button on the child safety device signals the child is in trouble and causes an alert condition sequence code to be sent from the child safety device to the parent safety device generating a visual and audio alert.

12. The wearable safety device of claim 1, wherein the phased-array radar system further comprises:
    a. a set of transmission circuits operating in an unlicensed V-Band or a lower frequency band; and
    b. power dividers optimized for 57/57.05 GHz.

* * * * *